United States Patent [19]

Hendrickson et al.

[11] Patent Number: 4,575,816

[45] Date of Patent: Mar. 11, 1986

[54] INTERACTIVE TRANSACTIONS PROCESSOR USING SEQUENCE TABLE POINTERS TO ACCESS FUNCTION TABLE STATEMENTS CONTROLLING EXECUTION OF SPECIFIC INTERACTIVE FUNCTIONS

[75] Inventors: Thomas A. Hendrickson, Charlotte; George C. Macauley, Concord, both of N.C.; Donald L. Pierce, Hyde Park, N.Y.; Robert W. Roefer; Alan B. Strickland, both of Charlotte, N.C.

[73] Assignee: International Business Machines Corporation, Armonk, N.Y.

[21] Appl. No.: 218,143

[22] Filed: Dec. 19, 1980

[51] Int. Cl.[4] .................. G06F 9/40; G06F 13/12; G06F 15/30

[52] U.S. Cl. .................................. 364/900; 235/379

[58] Field of Search ... 364/200 MS File, 900 MS File; 235/379-382; 340/365 S

[56] References Cited

U.S. PATENT DOCUMENTS

| | | | |
|---|---|---|---|
| 3,629,850 | 12/1971 | Clark et al. ................... | 340/172.5 |
| 4,091,446 | 5/1978 | DeMonte et al. ............. | 364/200 |
| 4,095,270 | 6/1978 | Blum et al. ................... | 364/200 |
| 4,107,782 | 8/1978 | Cochran ...................... | 364/706 |
| 4,115,853 | 9/1978 | Dummermuth ............... | 364/200 |
| 4,200,913 | 4/1980 | Kuhar et al. ................. | 364/900 |
| 4,212,077 | 6/1980 | Vittorelli ..................... | 364/900 |
| 4,293,913 | 10/1981 | Nishimura et al. ........... | 364/474 |
| 4,308,582 | 12/1981 | Berger ........................ | 364/300 |
| 4,314,329 | 2/1982 | Crewe et al. ................. | 364/141 |
| 4,319,336 | 3/1982 | Anderson et al. ............ | 364/900 |
| 4,374,625 | 2/1983 | Hanft et al. .................. | 400/98 |
| 4,480,305 | 10/1984 | Watson et al. ............... | 364/200 |
| 4,523,298 | 6/1985 | Sakurai ...................... | 364/900 |

OTHER PUBLICATIONS

Alternative Keystroke Functions Using Option Director Mask, C. J. Prokop, IBM Technical Disclosure Bulletin, vol. 20, No. 4 (Sep. 1977), pp. 1290-1291.

IBM System/370 Principles of Operation GA22-70-00-6, pp. 4-8 to 4-10, 6-5 and 6-6, 7-16 and 7-17, 13-1 and 13-2, A-14 and A-15.

IBM 3600 Finance Communication System Programmer's Guide GC22-9045-4, pp. 3-79.

*Primary Examiner*—James D. Thomas
*Assistant Examiner*—A. Williams
*Attorney, Agent, or Firm*—K. O. Hesse

[57] ABSTRACT

A peripheral processor has an architecture wherein the function controlling information of a program is separated from portions of the sequence of execution controlling information and each are stored in the form of tables. The function controlling information takes the form of a table including a plurality of function specifying entries. The function execution sequence controlling information takes the form of a table of pointers. In this invention, function controlling entries, each having a plurality of fields for defining, modifying, and specifying the functions and related data to be executed, need not be repetitively duplicated throughout the program. Instead, the shorter pointers to the function table entries can be provided in the sequence table in the sequence in which the functions are to be executed.

In a keyboard display controller application, further economy of storage is obtained by retaining a first level of function specifying information in the sequence table in the form of a bit identifying whether the function to be executed is a complex function, in which case the pointer identifies an entry in the function control statement table, or whether the function to be executed is merely the display of information on the display, in which case the pointer in the sequence table entry specifies an entry in a guidance table.

10 Claims, 6 Drawing Figures

FIG. 3
START/TRANSLATE TABLE FORMAT
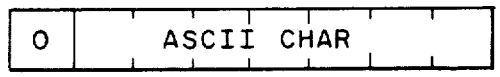
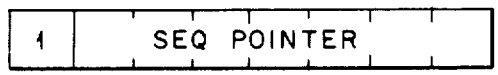
FIG. 4
SEQUENCE TABLE FORMAT
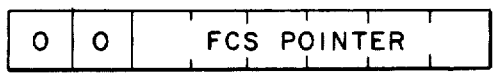
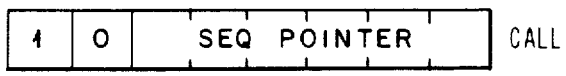
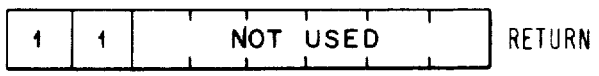

FIG. 5

NOTE: THE X IN BYTE 2 MEANS THE VALUE MAY BE EITHER 0 OR 1.

| BYTE 0 | BYTE 1 | BYTE 2<br>1 2 3 4 5 6 7 | BYTE 3 | FUNCTION |
|---|---|---|---|---|
| 00000001 | FLD LEN<br>FLD LEN<br>FLD LEN<br>FLD LEN | 0 0 0 0 1 1 0<br>0 0 0 0 1 1 0<br>0 0 0 1 0 0 0<br>0 0 0 1 0 1 0 | IGNORED<br>DELIMIT<br>IGNORED<br>IGNORED | LZ, VAR, WAIT, KBD INPUT<br>VAR, WAIT, KDB INPUT<br>FIX LEN, NO WAIT, KBD INPUT<br>FIX LEN, WAIT, KBD INPUT |
| 00000011 | IGNORED | IGNORED | IGNORED | MSR TRK 2 READ INPUT |
| 00000101 | IGNORED | 0 0 0 0 0 0 X | DATA | IMD DATA BYTE INPUT |
| 00000110<br>00000111<br>00001000<br>00001001 | FLD LEN<br>"<br>"<br>" | 0 1 0 0 0 X X<br>"<br>"<br>" | DISPLACE<br>"<br>"<br>" | STOR AREA 1 INPUT<br>" " " 2<br>" " " 3<br>" " " 4 |
| 00001010 | IGNORED | 0 0 0 0 X 0 0 | IGNORED | TRANSMIT |
| 00001011 | POINTER | IGNORED | IGNORED | FIXED BRANCH |
| 00001100 | POINTER<br>IGNORED | 0 0 0 0 X X X<br>1 0 0 0 X 0 X<br>(SEE NOTE) | DATA<br>IGNORED | VAR BRANCH - CONDITIONAL<br>VAR BRANCH - SELECTIVE | ions by entries in a sequence table.

INTERACTIVE TRANSACTIONS PROCESSOR USING SEQUENCE TABLE POINTERS TO ACCESS FUNCTION TABLE STATEMENTS CONTROLLING EXECUTION OF SPECIFIC INTERACTIVE FUNCTIONS

TECHNICAL FIELD

This invention relates to peripheral processor architecture and particularly to table implemented methods for controlling peripheral I/O devices. More particularly, the invention finds utility in economically controlling the operation of a keyboard display terminal using a minimum amount of storage, yet permitting easy modification of terminal operation.

BACKGROUND ART

It is well known to control input/output devices directly by a computer. With the advent of microcomputers, control logic for controlling the operation of input/output hardware such as a display terminal is often implemented in the form of a programmed microcomputer. The programs written for microcomputers are usually written in machine language or in an assembly language which can be directly translated into machine language. Alternately, a program can be written in a higher level language and compiled on a larger computer into the machine level language of the microcomputer. As a result, the operation of the I/O device is relatively rigidly predetermined by the machine language program. Usually these machine language programs are difficult to modify and therefore modification of the operation of the input/output hardware is a task reserved for programmers trained in the hardware detail of the specific microprocessor being used. In the event that several input/output control microprocessors are connected in a system, and if these microprocessors are of different manufacture, making changes in the operation of the system to perform a different application is very difficult and requires a high level of detail knowledge.

Where the program is compiled on a larger computer, significant communication time will be required to transmit the microprogram to the microcomputer. Also modification of the operation of the I/O device to permit error recovery without restarting the entire operation is very difficult. Either, all of the error recovery must be predetermined in the microcomputer program or new programs must be transmitted from the host computer. For example, if a bank's customer has entered the account number, secret number, and amount of withdrawal, it would be advantageous to be able to instruct the customer to re-enter only one of these items if it was received in error at the host. The microcomputer program could be written to accomodate all anticipated error recovery situations, but even then it would be desirable to handle unanticipated situations from a manually attended station at the host computer. If machine level programs must be transmitted from the host computer to the microcomputer, human intervention into an interactive transaction being attempted at a remote cash issuing machine will be very complicated and time consuming.

It is also well known to program a computer in a higher level language such as APL, which is more readily understood by computer programmers and computer users. Each instruction in the higher level language is often interpreted by the computer into a sequence of simpler machine level instructions which are executed in order to execute the function called for by the higher level instruction. Another example of higher level instruction is a macro instruction, which again is interpreted into the sequence of lower level instructions required to execute the desired function. Whether the higher level instructions are interpreted as mentioned above, compiled, or assembled, the final sequence of machine instruction is defined by the original sequence of higher level instructions.

A small step in the direction of the instant invention takes the form of the execute instructions of IBM System 370 architecture and the IBM 3600 Finance Communication System. These instructions cause a different instruction, stored at a specified location, to be executed. The effect of an execute instruction is to cause another instruction to be executed. No provision has been made for allowing an entire program to be written in the form of execute instructions and, even if such were the case, use of one instruction to cause the execution of another would not yield the economy of the instant invention.

It has been found to be costly to implement high level languages such as APL, or macro-languages in microcomputers because the interpreting required for high level languages requires a large amount of read only memory. This overhead interpretation cost is further magnified by the fact that the operation of input-/output hardware is not often changed in comparison to the amount of changes that are made in main computer programs. Accordingly, the burden of carrying the higher level language becomes a needless burden in between changes.

Lastly, it is known to have parameter tables in a remote terminal such as exist in the IBM 3624 cash issuing terminal. These tables store guidance display data and constants for use by branch on condition machine level program instructions. These tables, therefore, permit some variation in the execution of a machine level microprogram but do not permit basic revision of terminal operation from an operator at a control location.

SUMMARY OF THE INVENTION

In view of the background set forth above, it is an object of this invention to simplify the task of modifying the operation of an input/output device without substantially increasing program storage requirements at the input/output device.

It is a further object to implement control programs in a peripheral processor using less storage than would be required using conventional program methods, thereby permitting faster application changes.

It is a still further object of the invention to control the execution of functions of input/output devices with machine level programs, to control the specification of functions to be executed by entries in a function control table, and to control the sequence of execution of functions by entries in a sequence table.

It is an even further object of the invention to permit an input signal from an input device to initiate a sequence of functions for execution.

It is an even still further object of the invention to permit an input signal from a host computer to initiate execution of a sequence of functions beginning at any one of the functions of the sequence or of an entirely new sequence transmitted from the host computer.

In accordance with the present invention, the function controlling information of a program is separated from portions of the sequence of execution controlling information and each are stored in the form of tables. The function controlling information takes the form of a table including a plurality of function specifying entries. The function execution sequence controlling information takes the form of a table of function pointers. In this invention, function controlling entries, each having a plurality of fields for defining, modifying, and specifying the functions and related data to be executed, need not be repetitively duplicated throughout the program. Instead, the shorter pointers to the function table entries can be provided in the sequence table in the sequence in which the functions are to be executed.

Further economy of storage is obtained by retaining a first level of function specifying information in the sequence table in the form of a bit identifying whether the function to be executed is a complex function, in which case the pointer identifies an entry in the function control statement table, or whether the function to be executed is merely the display of information on a display, in which case the pointer in the sequence table entry specifies an entry in a guidance table.

Improved flexibility of the invention is obtained by providing a branch calculation function in the functions of the function control statement table for determining whether or not a branch is to be taken in the sequence of the sequence table.

Further flexibility of operation of a keyboard terminal is obtained by providing a translate table to translate a function key stroke into the location of an entry in the sequence table whereby an interactive transaction, including one or more interactive functions, can be initiated from a key of the keyboard.

Even further flexibility is provided by accepting the location of a sequence table entry from a remote computer, thereby permitting a remote computer to initiate execution of one or more transactions, beginning at any function in the sequence of functions which constitute the transaction.

BRIEF DESCRIPTION OF THE DRAWINGS

FIG. 3 shows the start/translate table entry format.

FIG. 4 shows the sequence table entry format.

FIG. 5 shows the meanings of the various bits of the various fields of the function control statement table entries.

DESCRIPTION OF A BEST MODE FOR CARRYING OUT THE INVENTION

Figure 1:
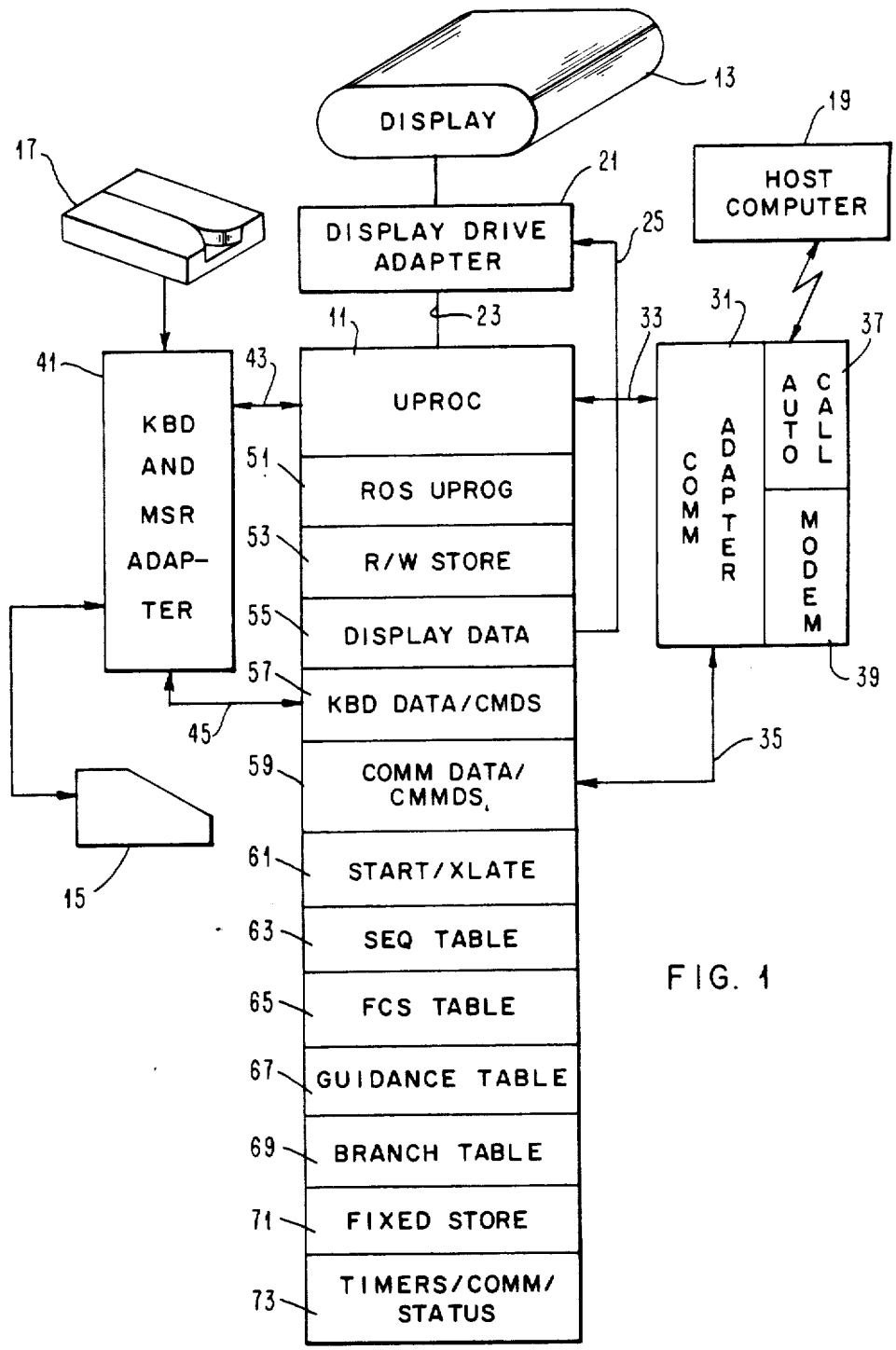
FIG. 1 is a schematic diagram showing physical wiring connections between a control microcomputer and input/output hardware.

Referring to FIG. 1, an example embodiment of the invention in the form of an Intel 8085 microprocessor 11 driving a linear light emitting diode display 13 with information from a keyboard 15, a magnetic stripe reader 17, or a host computer 19 is shown. The display 13 is connected to the microprocessor 11 by display drive circuits and adapter logic 21. Logic 21 has a programmed I/O bus connection 23 to microprocessor 11 and an address and data bus connection 25 to the memory for receiving display data from a memory mapped display output buffer. Likewise, the communication adapter 31 has a programmed I/O bus connection 33 to microprocessor 11 and an address and data connection 35 to the memory. The auto call unit 37 and modem unit 39 are connected to communication adapter 31 for communication to host computer 19. The keyboard and magnetic stripe reader adapter 41 is similar to the other adapters but, in this case, is also implemented by a microprogrammed microprocessor. Adapter 41 has a programmed I/O bus connection 43 to microprocessor 11 and an address and data bus connection 45 to the memory. Keyboard 15 and magnetic stripe reader 17 are connected to input and output registers, not shown, which are memory mapped to the microprocessor of adapter 41. As shown in the block contiguous with microprocessor 11, the available address space of microprocessor 11 is divided into read only storage, read/write storage, including memory mapped buffers, and the control tables. The control tables and fixed storage are implemented in CMOS technology so that data stored in these portions of the storage address space can be retained with battery power when A/C power is turned off at the terminal. Merely reloading these short tables permits the terminal's functional characteristics to be altered to suit a different application.

Some applications, in particular point of sale, involve networks of high numbers of terminals, configured in geographically widely dispersed locations. In this case, there is benefit in being able to modify terminal functions as applications change and as more applications are performed, and to control this change from a central site.

Figure 2:
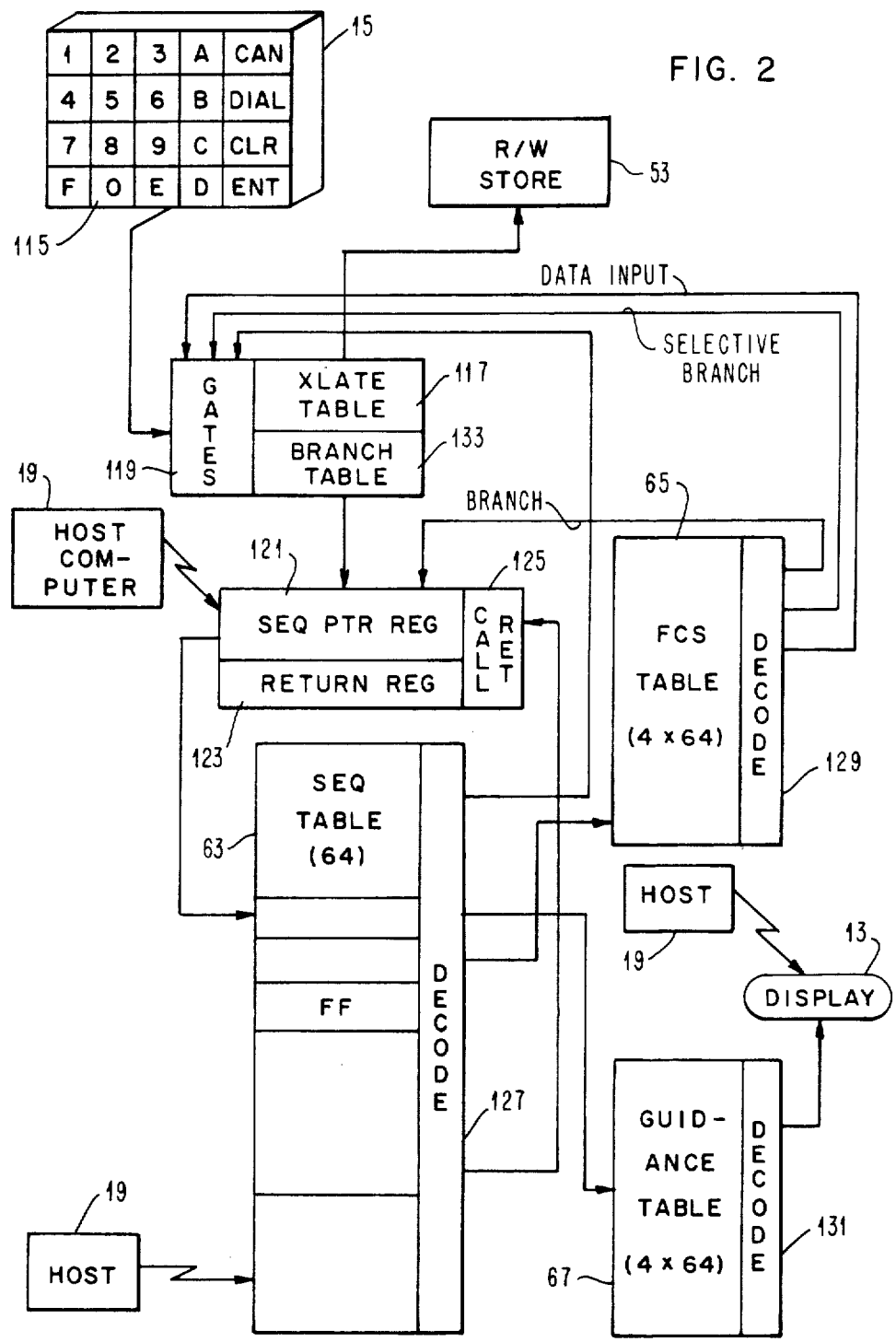
FIG. 2 is a diagram showing the logical relationship of the microprocessor, the read only storage microprogram, and the read/write storage, in accord with the architecture of the invention.

Referring now to FIG. 2, a logical diagram of the relationship between the keyboard, display, host computer, and read/write storage with various tables is set forth in order to provide a better understanding of the operation of a peripheral processor incorporating the invention. A matrix of keys on keyboard 15 provides key coordinate signals to translate table 117 through a plurality of logic gates 119. The logic gates 119 in this preferred embodiment are implemented in the microprogram in read only storage 51 of FIG. 1.

During normal operation, the keyboard can be used in two different states. A first state is during the wait state when the terminal is waiting for the next command in the form of a function keystroke from the keyboard. When a function key is depressed while the terminal is in the wait state, the coordinates of the function key are gated into translate table 117 which in turn provides the pointer to an entry in the sequence table 63. The translate table 117 contains a separate entry for each key. In the embodiment of this example, there are ten numeric keys and six function/data keys for a total of sixteen. Accordingly, the translate table need have only sixteen entries. Four additional keys are provided on keyboard 15. They are Cancel, Dial, Clear, and Enter. The functions performed by these keys are permanent in nature and can, therefore, be permanently implemented in the microprogram of read only storage 51 and need not be translated in accordance with the invention. A further explanation of these permanent functions will be provided subsequently as part of the explanation of the operation of the invention.

In this example, each entry in the translate table is an eight bit byte. One of the bits in each entry of the translate table specifies whether the key being depressed is a data key or a function key. If the key being depressed is a data key, the remaining seven bits of the byte is the ASCII code for the key being depressed. This ASCII data code is entered into read/write store 53.

If the key being depressed is a function key, the remaining seven bits are a sequence pointer to an entry in sequence table 63. Although seven bits will point to one hundred and twenty eight different entries, only sixty-four are used as will be explained below.

Translate table 117 is connected to a sequence pointer register 121 which temporarily stores the sequence pointer received from translate table 117 or received directly from host computer 19. Sequence pointer register 121 is part of a stack of two registers including the sequence pointer register 121 and a return register 123. The return register 123 is used if a sub-routine call is to be implemented. The sequence pointer register is incremented by the microprogram in read only storage 51 shown in FIG. 1 whenever the microprogram completes execution of a function specified for execution by an entry in function control statement table 65, shown in FIG. 5 and also shown in Table 1.

As previously stated, the pointer in sequence pointer register 121 points to an entry in sequence table 63. Each entry in sequence table 63 is also a single byte entry. Referring to FIG. 4, it can be seen that the most significant bit of each byte is used to implement call and return sequencing. If the most significant bit is a binary one, and the next most significant bit is a binary zero, a call sequence is to be executed and the six lesser significant bits are the pointer to the sequence table entry where the called sub-routine sequence is stored. It is this limitation of six lesser significant bits that limits the sequence table 63 to sixty-four entries. The call sequence pointer is transferred into sequence pointer register 121 after the contents of sequence pointer register 121 has been pushed into the return register 123. Inasmuch as sequence 121 now points to the start of the subroutine, the sequence of functions pointed to by the entries in the sequence table beginning with this new point, are executed in sequence as the microprogram of read/only storage 51 interprets and executes each function control statement and increments sequence pointer register 121. When a sequence table entry has a binary one in the two most significant bit positions, a return to the original sequence is taken by popping the original sequence pointer out of return register 123 into sequence pointer register 121.

If the most significant bit of a sequence table entry is a binary zero, a function is to be executed. If the second most significant bit is also a binary zero, the six lesser significant bits are a pointer into the function control table. If the most significant bit is a binary zero and the next most significant bit is a binary one, the six lesser significant bits are a pointer into the guidance table 67.

A sequence table entry of all binary one's (hex FF), signifies that the end of a sequence has been encountered. The microprogram in read/only store 51 interprets this all ones sequence table entry as a command to put the terminal in the wait state and permit a function key stroke from keyboard 15 to start a new sequence via translate table 117.

Referring now to FIG. 5, a table is shown indicating the significance of each bit in the four bytes of each function control statement. The byte zero is the opcode byte analogous to the opcode of any computer instruction. Because of the limited function of the terminal of this example, only four bits of the opcode byte are required and the least significant four bits have been chosen to implement ten different opcodes.

Opcode 1 specifies a read keyboard function which is the second state in which the keyboard can be used. Opcode 3 specifies a read magnetic stripe function. Opcode 5 specifies that an immediate data byte from byte 3 is to be read. Opcodes 6, 7, 8, and 9 specify that bytes from storage areas 1, 2, 3, and 4 are to be read. These opcodes may be used for dialing. Opcode A specifies that the data in the message in read/write storage is to be transmitted to the host computer. Opcode B specifies that a branch is to be taken to the sequence table entry pointed to by the contents of byte one. Opcode C specifies that a conditional or selective branch is to be taken.

The byte one of a function control statement specifies the field length in read statements and is the pointer in fixed and conditional, but not selective, branch statements. Accordingly, when a branch function control statement is being executed, the contents of byte one are transferred to sequence pointer register 121 depending upon whether or not the branch is taken. Note, however, that a selective branch function causes a new sequence pointer to be received from branch table 133.

Byte two of each function control statement, as shown in FIG. 5, constitutes an opcode modifier byte. Bit 1 is a branch modifier bit which converts a conditional branch opcode C to a selective branch opcode. When a selective branch function is executed, the selective branch line from function control statement decode 129 to gates 119 in FIG. 2 is active. Gates 119 then cause keyboard input signals to access entries in branch table 133 and effectively be translated into sequence pointer values. Branch table 133 operates almost identically to translate branch table 117 except that instead of initiating an entirely new sequence of functions, branch table 133 merely causes the sequence of functions being executed to follow one of 16 possible alternatives.

Bit 2 is the dial modifier bit which causes the data being read from a storage area to be presented to the auto call adapter 37 instead of being transferred to the message buffer in read/write store 53.

Bit 3 is a left zero fill bit which causes the higher order character positions of a variable length field to be filled out with zeros when the Enter key is depressed.

Bit 4 is the variable input control bit which permits key entry of less characters than the maximum field length specified by the second byte of the same function control statement. Depression of the enter key causes the data byte in the fourth byte position to be inserted into the input buffer in read/write store 53 as a delimiter byte indicating the end of the field. If the left zero field bit 3 is also on, the maximum field length is filled out with zeros and the key entered data will be right justified in the field.

Bit 5 of byte two of a function control statement is a wait bit. The wait modifier bit modifies a keyboard input opcode to inhibit advance of sequence pointer register 121 until the enter key is depressed. If the wait modifier bit is not a binary one, the key entry field must be fixed length field. The wait bit permits the user to look at the entire entered field before the terminal sequences to the next function to be executed. The operator of the terminal could use the Cancel key or Clear key instead of the Enter key. If the function control statement opcode is transmit, the wait bit modifier causes the terminal to wait for a response message from the host before the sequence pointer register 121 can be incremented to the next sequence step. If the wait bit is off, the terminal proceeds to the next sequence step as soon as transmission of the inbound message to the host has been completed.

Bit 6 is the hex mode bit and permits data to be read from fixed storage locations 71 of FIG. 1 in hexadecimal.

Modifier bit 7 is the track display modifier for read keyboard, read storage and read immediate opcode. When on during execution of a read keyboard function, the input data will be displayed. Data is entered at the right of the display and shifts to the left as each new key entry occurs. During read storage and read immediate function, the displayed data is left justified on the display yielding the same display appearance as when executing a read keyboard function.

The byte three of the function control statement is the immediate data byte. The immediate data byte has four uses. First, during a conditional branch function execution, byte three is compared with the keyboard input to determine if the branch is to be taken. Second, byte three is used as the end of field delimiter on variable length fields. Third, this immediate data byte is the source of input for the read immediate command. Fourth, the immediate data byte is used as a displacement into storage 71 when executing a read storage function.

OPERATION OF THE INVENTION

Having described the structure and implementation of the invention, the operation of an interactive terminal employing the method and apparatus according to the invention will be explained with reference to Table 1, which is a list of twenty function control statements, and Table 2, which is an example guidance table. Table 3 contains a listing of the sequence table entry numbers, the pertinent function control statement numbers, the pertinent guidance table entry numbers, and comments for each step in the operation of a plurality of transactions which can be executed by the example keyboard display terminal employing the invention.

TABLE 1

| NO. | BYTE 0 FUNCT | BYTE 1 LENGTH | BYTE 2 MODIFY | BYTE 3 IMD |
|---|---|---|---|---|
| 00 | STO3 | 12 | H.DIAL | 00 |
| | Comment: | Dial (1*800 number) | | |
| 01 | STO1 | 13 | | 00 |
| | Comment: | MSG HEADER DATA FROM STOR 1 | | |
| 02 | IMD | | | 4C |
| | Comment: | START OF MAGNETIC DATA IDENTIFIER | | |
| 03 | MSR | | | |
| | Comment: | MSR DATA TO MSG BFR | | |
| 04 | IMD | | | 1B |

TABLE 1-continued

| NO. | BYTE 0 FUNCT | BYTE 1 LENGTH | BYTE 2 MODIFY | BYTE 3 IMD |
|---|---|---|---|---|
| | Comment: | ESC CHAR | | |
| 05 | IMD | | | 03 |
| | Comment: | ETX CHAR | | |
| 06 | KBD | 5 | V,W | 1B |
| | Comment: | 0-5 DIGITS + ENTER | | |
| 07 | XMIT | W | | |
| | Comment: | TRANSMIT, WAIT FOR HOST RESP | | |
| 08 | SELBR | | | |
| | Comment: | SELECTIVE BRANCH | | |
| 09 | IMD | | | 3C |
| | Comment: | $ CHAR to MSG BFR | | |
| 10 | KBD | 16 | V,W | 1B |
| | Comment: | 0-16 DIGITS + ENTER | | |
| 11 | KBD | 1 | V,W | 1B |
| | Comment: | 0-1 DIGITS + ENTER | | |
| 12 | KBD | 4 | V,W | 1B |
| | Comment: | 0-4 DIGITS + ENTER | | |
| 13 | KBD | 2 | V,W | 1B |
| | Comment: | 0-2 DIGITS + ENTER | | |
| 14 | IMD | | | 3C |
| | Comment: | ACC # FIELD IDENTIFIER | | |
| 15 | IMD | | | — |
| | Comment: | SEQ # FIELD IDENTIFIER | | |
| 16 | IMD | | | — |
| | Comment: | APPR CODE FIELD IDENTIFIER | | |
| 17 | BR | 5 | | |
| | Comment: | UNCONDITIONAL BRANCH TO SEQ 05 | | |
| 18 | IMD | | | 00 |
| | Comment: | NULL CHAR | | |
| 19 | BR | 8 | | |
| | Comment: | UNCONDITIONAL BRANCH TO SEQ 08 | | |
| 20 | BR | 48 | | |
| | Comment: | UNCONDITIONAL BRANCH TO SEQ 48 | | |

TABLE 2

| | 0 | 1 | 2 | 3 | 4 | 5 | 6 | 7 | 8 | 9 |
|---|---|---|---|---|---|---|---|---|---|---|
| 0 | INSE | RT F | ORM* | ENTE | R DO | LLAR | AMO | UNT* | ENTE | R AC |
| 1 | COUN | T #* | ENTE | R SE | QUEN | CE#* | ENTE | R FU | NCTI | ON C |
| 2 | ODE* | | | | ENTE | R AP | PR C | ODE* | IN P | ROCE |
| 3 | SS | | ENTE | R CA | RD T | YPE* | SWIP | E CA | RD* | |

*is hex 'FF' (End of message segment)

Guidance Table 2, above, is organized in four byte words, just as the function control statement table is organized. In fact, the guidance table can be viewed as merely an extension of the function control statement Table 1 with the next to the highest order bit of the sequence table entry interpreted as the next higher order address bit. Use of both highest order bits to define CALL and RETURN functions preclude such a simplified implemention in this preferred embodiment, however.

Each four byte word in the guidance Table 2 is identified by the row number representing the tens position and the column number being the units. For example, display table entry thirty-five begins the message "SWIPE CARD". Because each word includes four bytes, actual addressing involves adding a base address value to four times the guidance message number to get the first byte of the message from memory. An example of a microprogram to implement actual retrieval from memory appears in Table 4.

TABLE 3

| ROUT | SEQ# | FCS# | GUID# | COMMENT |
|---|---|---|---|---|
| HDR | 00 | 00 | — | Dial (1*800 number form STOR 3) |
| | 01 | 01 | — | MSG header from STOR 1 |

TABLE 3-continued

| ROUT | SEQ# | FCS# | GUID# | COMMENT |
|------|------|------|-------|---------|
| MSR | 02 | 02 | — | MSR Field char from IMD field |
|  | 03 | 03 | — | Read MSR data to MSG BFR |
|  | 04 | 04 | — | End of Field Char from IMD field |
| $AMT | 05 | — | 03 | Prompt "ENTER DOLLAR AMOUNT" |
|  | 06 | 09 | — | Amt Char hex $ from IMD field |
|  | 07 | 06 | — | Read Amt Field + Enter Key |
| XMIT | 08 | — | 28 | Prompt "IN PROCESS" |
|  | 09 | 18 | — | NULL Char from IMD field |
|  | 10 | 05 | — | ETX Char from IMD field |
|  | 11 | 07 | — | Transmit and Wait HOST response |
|  | 12 | hex'FF' in | — | SEQ Byte to return to wait state |
|  | 13 | 00 | — | Dial (1*800 number from STOR 3) |
|  | 14 | 01 | — | MSG Header from STOR 1 |
| ACCT | 15 | — | 31 | Prompt "ENTER CARD TYPE" |
|  | 16 | 11 | — | Read KBD 1 Char + ENTER |
|  | 17 | — | 08 | Prompt "ENTER ACCOUNT #" |
|  | 18 | 14 | — | hex# Char from IMD field |
|  | 19 | 10 | — | Read KBD 16 Char Acct# + ENTER |
| BR | 20 | 17 | — | Branch to SEQ 05 |
|  | 21 | — | 16 | Prompt "ENTER FUNCTION CODE" |
| HDR | 22 | 00 | — | Dial (1*800 number from STOR 3) |
|  | 23 | 01 | — | MSG header from STOR 1 |
|  | 24 | 08 | — | Selective Branch<br>0 Key - SEQ 08 Initialization<br>1 Key - SEQ 08 Trial Balance<br>2 Key - SEQ 05 Balance<br>3 Key - SEQ 02 Credit (w card)<br>4 Key - SEQ 25 Add on<br>5 Key - SEQ 32 Delete<br>6 Key - SEQ 25 Change<br>7 Key - SEQ 39 Bulletin (w card)<br>8 Key - SEQ 44 Preauth. (w card)<br>B Key - SEQ 15 Credit (w/o card)<br>C Key - SEQ 55 Bulletin (w/o card) |
| $AMT | 25 | — | 03 | Prompt "ENTER DOLLAR AMOUNT" |
|  | 26 | 09 | — | AMT Char hex $ from IMD field |
|  | 27 | 06 | — | Read Amt Field + ENTER Key |
| SEQ# | 28 | — | 12 | Prompt "ENTER SEQUENCE #" |
|  | 29 | 15 | — | SEQ # character from IMD Field |
|  | 30 | 12 | — | Read KBD 4 Char SEQ field + ENTER |
|  | 31 | 17 | — | Branch to SEQ 05 |
| $AMT | 32 | — | 03 | Prompt "ENTER DOLLAR AMOUNT" |
|  | 33 | 09 | — | Amt Char hex $ from IMD field |
|  | 34 | 06 | — | Read Amt Field + Enter Key |
| SEQ# | 35 | — | 12 | Prompt "ENTER SEQUENCE #" |
|  | 36 | 15 | — | SEQ # character from IMD field |
|  | 37 | 12 | — | Read KBD 4 Char SEQ field + ENTER |
|  | 38 | 19 | — | Branch to SEQ 08 |
|  | 39 | — | 35 | Prompt "SWIPE CARD" |
| MSR | 40 | 02 | — | Field Identifier from IMD field |
|  | 41 | 03 | — | Read MSR Data to MSG BFR |
|  | 42 | 04 | — | End of Field Char from IMD field |
|  | 43 | 19 | — | Branch to SEQ 08 |
|  | 44 | — | 35 | Prompt "SWIPE CARD" |
| MSR | 45 | 02 | — | Field Identifier from IMD field |
|  | 46 | 03 | — | Read MSR Data to MSG BFR |
|  | 47 | 04 | — | End of Field Char from IMD field |
| $AMT | 48 | — | 03 | Prompt "ENTER DOLLAR AMOUNT" |
|  | 49 | 09 | — | Amt Char Hex $ from IMD field |
|  | 50 | 06 | — | Read Amt Field + Enter Key |
| APP | 51 | — | 24 | Prompt "ENTER APPR CODE" |
|  | 52 | 16 | — | Approval Code Field Identifier |
|  | 53 | 13 | — | Read KBD 2 Char + Enter Key |
|  | 54 | 19 | — | Branch to SEQ 08 |
| ACCT | 55 | — | 31 | Prompt "ENTER CARD TYPE" |
|  | 56 | 11 | — | Read KBD 1 Char + Enter |
|  | 57 | — | 08 | Prompt "ENTER ACCOUNT #" |
|  | 58 | 14 | — | hex# Char from IMD field |
|  | 59 | 10 | — | Read KBD 16 Char ACCT# + ENTER |
| BR | 60 | 19 | — | Branch to SEQ 08 |

Figure 6:
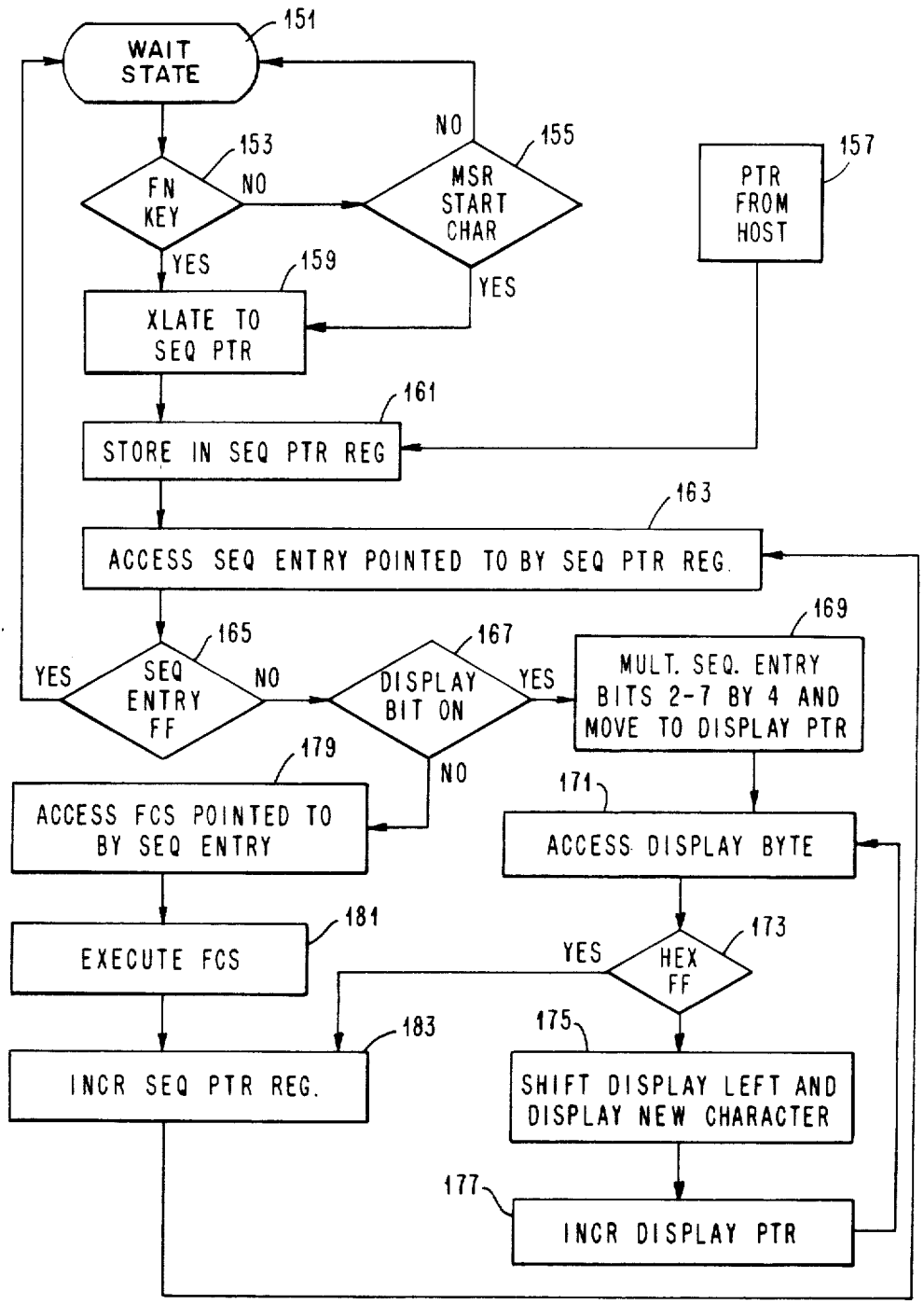
FIG. 6 shows a flow diagram of the operation of a terminal using the invention.

Sequence table entry numbers 00 through 12 of Table 3 define a normal charge transaction using a magnetic stripe card. FIG. 6 shows a flow diagram of the terminal operation under control of the sequences in Table 3. Control of the terminal is transferred from the wait state 151 to sequence table entry number 00 by passing the magnetic stripe card through the card reader. The start of message code on the beginning of the stripe is received directly from adapter 41 by programmed I/O bus 43 for translation at block 159 into the sequence table entry number 00 which is then stored in the sequence pointer register 121 at block 161. Sequence table entry 00 points to function control statement entry 00, which from Table 1, can be seen to be an instruction to read the telephone number from storage location 3 and activate the auto call adapter 37 to dial the telephone number stored in storage location 3 of fixed storage 71. Having activated the auto call adapter 37, at FIG. 6, block 181, the microprogram in read only storage 51 increments the count in sequence pointer register 121 at FIG. 6, block 183 to point to sequence table entry 01. Sequence table entry 01 points to function control statement 01 which reads the information in fixed storage location 1 of fixed store 71 to provide the header information for the message which will be ultimately transmitted to the host computer. The header information is transferred to the message buffer of read write store 53. Read write store 53 is a part of random access memory operated sequentially by the microprogram. That is, the first byte goes in the first byte location and any subsequently written byte is stored in a following byte location under control of the microprogram in read only storage 51. Subsequent sequence table entry numbers 02, 03 and 04 select corresponding instructions in the function control statement table to identify a field, read magnetic stripe data from a hardware magnetic stripe data buffer, and insert an end of field character from the immediate field of functional control statements, 02, 03, and 04.

Field identification is accomplished by moving the MSR field identifier character byte from the immediate field of function control statement 02 to the message buffer in read write store 53. Magnetic stripe data is read and must be passed to a hardware shift register because it arrives faster than can be handled by the Intel 8041 in adapter 41. The MSR data in the hardware shift register is moved to the microcomputer through the memory mapped KBD DATA/CMDS storage area 57, one byte at a time.

When the microprogram in read only storage 51 increments the sequence pointer register 121 to sequence table entry 05, a binary one bit is found at FIG. 6, block 167, in the next to the highest bit position causing the binary number three in the six lower order positions to be interpreted as the third word of the guidance table shown in Table 2. Guidance table words three through seven contain the guidance display message "ENTER DOLLAR AMOUNT". A hex FF appears after the word AMOUNT, which is recognized by the microprogram in read only storage 51 as an end of guidance message character at FIG. 6, block 173 to again increment the sequence pointer register 21 to sequence 06. The guidance message remains on display 13 until the next function control statement has been fully executed. Sequence 06 points to function control statement entry number 09 to insert a dollar sign in the front of the amount field to be subsequently entered. Sequence number 07 points to function control statement 06 which is an instruction to read up to 5 bytes from the keyboard and wait until the enter key has been depressed. Sequence numbers 08, 09, 10 and 11 cause a display of an "IN PROCESS" guidance message, insert the transmission control characters, and transmit the requested dollar amount to be charged to the host computer and wait for a response.

The host computer program will act upon the requested charge and return a message such as "Approved" or "Not Approved". An approved response may also include an approval number which the clerk is to write on the sales document, or if a printer is part of the terminal, the number can be printed on the document by the printer. In this example, host display messages are directly displayed on display 13 under control of the microprogram in read only store 51. This is the most efficient way to display response messages from host computer 19 because there is a very low likelihood that there would be a need for the institution owning the terminal to change the method of display at the terminal. This is because the message itself is created at the host computer 19 and can be provided in any sequence desired.

After a response message has been received from host computer 19 and displayed on display 13, the microprogram in read only storage 51 increments sequence pointer register 121 to sequence 12 which contains all one bits. The all one bits are interpreted by the microprogram to return the terminal to the wait state.

In the event that the dollar amount requested was excessive, the host computer could display a message on display 13 such as "amount requested too large". Thereafter, the host computer could send a sequence pointer byte containing the number five to sequence pointer register 121. The new contents of sequence pointer 121 would then reinitiate this normal charge transaction at sequence step 05 causing the display of "Enter Dollar Amount" permitting the terminal user to enter a smaller dollar amount which may be within the line of credit without repeating sequence steps of dialing the telephone and reading the magnetic stripe card. Alternately, at the discretion of the institution owning the terminal, the host computer could send a different sequence number to continue the interactive transaction at a different step in the sequence without requiring any change in the microprogram of read only storage 51, and without anticipating at what step in the sequence the transaction need be continued.

The remainder of Table 3 shows several interactive transactions, many of which utilize function control statement number 17 to branch to sequence pointer table entry number 5 to complete the transaction. At sequence number 38 of Table 3, however, a branch is taken to sequence number 8 to bypass entering the dollar amount.

At sequence step 24 of Table 3, a selective branch is executed by function control statement 08 to permit the terminal operator to select one of a plurality of interactive transactions from the keyboard by depressing the appropriate key. The operator is guided to depress the appropriate key by the previously displayed prompt message "Enter Function Code".

As can be seen from a review of the Tables 1 through 3, flexible operation of a peripheral I/O device can be obtained without consideration of every possible change in a transaction which might be desired by the institution owning the terminal.

TABLE 4

| LOC | OBJECT CODE | ADR1 | SOURCE STATEMENT | COMMENT |
|-----|-------------|------|------------------|---------|
| 00297 | 2A1440 | 4014 | LHLD STADR | GET SEQ TABLE ADDRESS |
| 0029A | 7E |  | MOV A,M | MOVE SEQ BYTE TO ACC |
| 0029B | FEFF |  | CPI FF | IS THIS END OF SEQ |
| 0029D | CAE202 | 02E2 | JZ FCSA | JUMP IF END OF SEQ |
| 002A0 | E6C0 |  | ANI C0 |  |

TABLE 4-continued

| LOC | OBJECT CODE | ADR1 | SOURCE STATEMENT | COMMENT |
|---|---|---|---|---|
| 002A2 | FEC0 | | CPI C0 | TEST FOR RETURN CODE |
| 002A4 | CA3403 | 0334 | JZ FCSH | JUMP IF RETURN CODE |
| 002A7 | FE80 | | CPI | |
| 002A9 | 7E | | MOV A,M | MOVE SEQ BYTE TO ACC |
| 002AA | CA1E03 | 031E | JZ FCSI | JUMP IF CALL CODE |
| 002AD | E640 | | ANI 40 | TEST FOR GUIDANCE MESSAGE |
| 002AF | 7E | | MOV A,M | MOVE SEQ BYTE TO ACC |
| 002B0 | C2FD02 | 02FD | JNZ FCSB | JUMP IF THIS IS A GUIDANCE MESSAGE |
| 002B3 | 210348 | 4803 | LXI H,FCSTBL | GET FCS TABLE BASE ADDRESS |
| 002B6 | 4F | | MOV C,A | MOVE SEQ BYTE TO REG C |
| 002B7 | 0600 | | MVI B,0 | ZERO REG B |
| 002B9 | CD3D03 | 033D | CALL MODSTA | MULTIPLY FCS PTR IN SEQ BYTE BY 4 |
| 002BC | 09 | | DAD B | GENERATE TRUE FCS ADDRESS BY ADDING 4 TIMES SEQ BYTE TO START ADDRESS OF FCS TABLE TO GET FIRST BYTE OF THE FCS |
| 002BD | CD4D03 | 034D | CALL FCSFET | FETCH AND DECODE FCS INSTRUCTION |

Referring now to Table 4 above, an example microprogram for programming an Intel 8085 microcomputer to execute the example operation of fetching the next function control statement is set forth. Because the machine language of the Intel 8085 is well known in the published literature, an explanation of the instructions in this program will not be stated in detail.

The microprogram of Table 4 has nineteen instructions. The first two instructions implement block 163 of FIG. 6. Instructions five through ten relate to CALL and RETURN which are not shown in FIG. 6. Instructions eleven, twelve and thirteen perform the decision of decision block 167 in FIG. 6. Instructions fourteen through eighteen execute the function block 179 and instruction nineteen points to a sub-routine which executes block 181.

The example microprogram in Table 4 is an example of the skill available in the art to program any of several available microcomputers to implement the invention. Likewise, it will be recognized that the logical flow of FIG. 6 could be embodied in random AND/OR gates and registers or as one or more programmed logic arrays by digital logic design practitioners.

We claim:

1. In an interactive transaction processor comprising a computer, storage, and input/output devices, the improvement comprising:
    a function control statement table containing a plurality of function control statements, each function control statement specifying a function to be executed as part of an interactive transaction to be performed by said interactive transaction processor;
    a sequence table containing a plurality of function pointers, said function pointers pointing to specific function control statements, which are needed to perform a specific interactive transaction;
    logic means responsive to an input signal for controlling said interactive transaction processor to perform said interactive transaction by executing said specific function control statements, the sequence of their execution being determined by the sequence of said function pointers in said sequence table.

2. The interactive transaction processor of claim 1 further comprising:
    a keyboard for providing input signals to said logic means;
    a translate table containing the definition of a plurality of input characters to be received from said keyboard, at least one of said definitions being a sequence pointer to a function pointer entry in said sequence table to select an interactive transaction, and another of said definitions being a data code representation of a data character;
    said logic means further comprising logic utilizing said sequence pointer definition to initialize utilization of said function pointer entry for executing a function control statement pointed to by said function pointer entry, and for utilizing a subsequent sequential function pointer entry in said said sequence table to perform said transaction.

3. The interactive transaction processor of claim 1 wherein said logic means further comprises:
    register means operatively connected to said translate table for storing said sequence pointer; and
    logic in said logic means for incrementing said sequence pointer in order to access a next sequential sequence table entry.

4. The interactive transaction processor of claim 3 further comprising:
    means for displaying guidance messages to an operator of said keyboard;
    a guidance message table having a plurality of guidance messages;
    said logic means including logic responsive to a guidance pointer entry in said sequence table for displaying the guidance message identified by said guidance pointer.

5. The interactive transaction processor of claim 3 wherein:
    said keyboard provides said input signals to said logic means; and
    said logic means includes logic responsive to a function control statement in said function control statement table to receive said input signal from said keyboard and cause the execution of another function specified by another function control statement identified by a nonsequential pointer in said sequence table.

6. An improved interactive terminal of the type including a keyboard controlled by microcomputer for communication with a computer, wherein the improvement comprises:
- a function control statement table containing a plurality of function control statements at least some of said function control statements being interpreted by said microcomputer to execute respective interactive functions;
- a sequence table containing a plurality of sequences of function pointers, at least two of said function pointers in said sequence table pointing to the same function control statement in said function control statement table;
- a translate table containing definitions of keys of said keyboard, some of said definitions being a sequence pointer to a sequence of said function pointers in said sequence table and others of said definitions being data code representations of the legend of the related key.

7. The terminal of claim 6 further comprising:
a display for receiving a plurality of guidance messages in sequence, said sequence identified by entries in said sequence table.

8. The terminal of claim 6 further comprising:
register means operatively connected to said translate table for storing said sequence pointer to said sequence table entry;
logic means in said microcomputer for incrementing said sequence pointer to said sequence table entry in said register means in order to access a next sequential sequence table entry.

9. The terminal of claim 8 further comprising:
message decode means for decoding a part of a message from said computer and using another part of said message in substitution for entries in said sequence table in order to execute a unique transaction.

10. The terminal of claim 7 further comprising an input from said computer to said display for displaying response messages from said computer to an operator of said terminal.

* * * * *